(No Model.)
J. S. HARSHMAN.
RAILWAY RAIL.
No. 348,673. Patented Sept. 7, 1886.
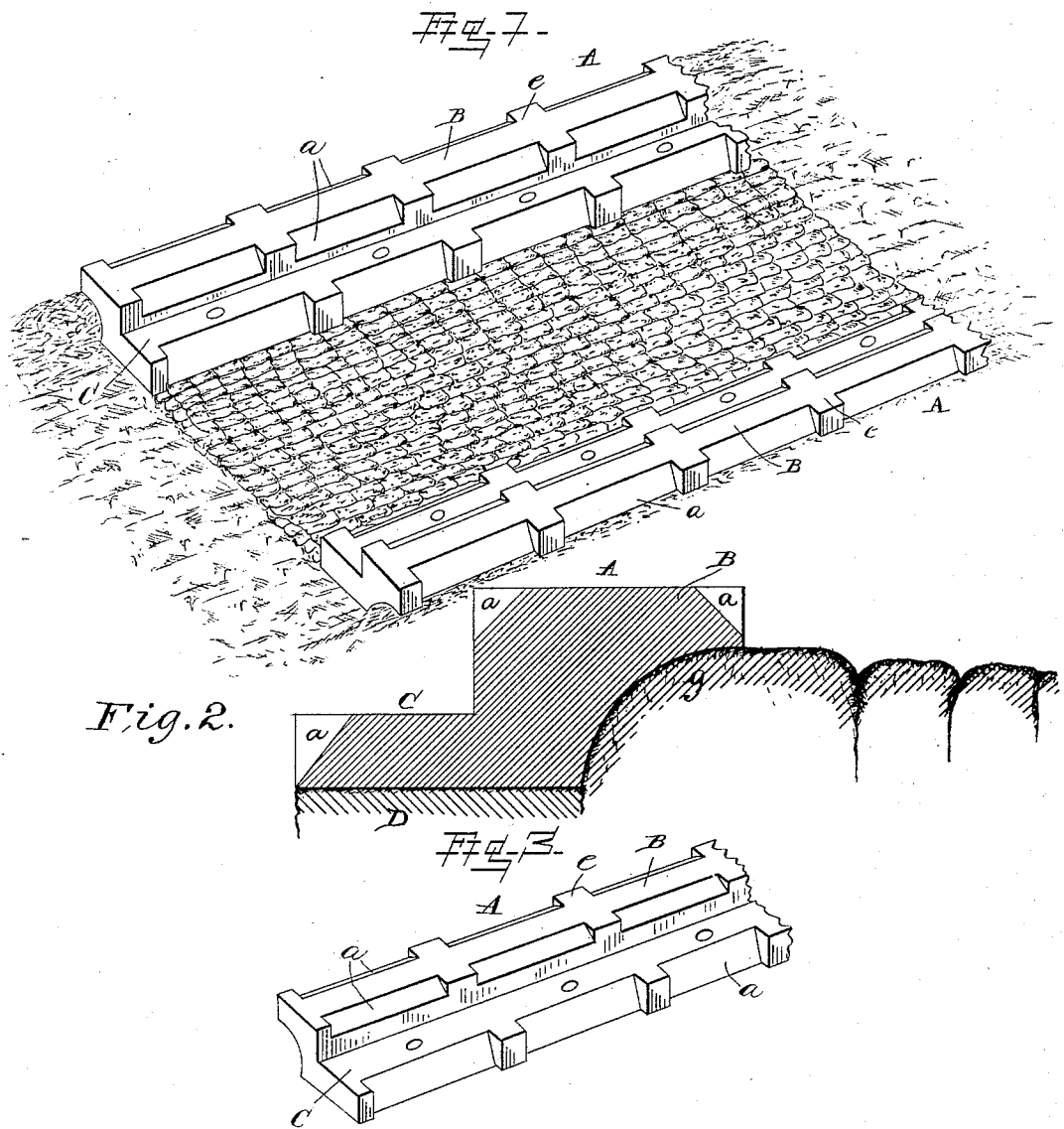

UNITED STATES PATENT OFFICE.

JONATHAN S. HARSHMAN, OF HARSHMAN, OHIO.

RAILWAY-RAIL.

SPECIFICATION forming part of Letters Patent No. 348,673, dated September 7, 1886.

Application filed June 5, 1886. Serial No. 204,217. (No model.)

*To all whom it may concern:*

Be it known that I, JONATHAN S. HARSHMAN, a citizen of the United States, residing at Harshman, in the county of Montgomery and State of Ohio, have invented certain new and useful Improvements in Railway-Rails; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to improve street-railroad tracks so as to permit a vehicle to travel on or cross them with absolute safety and without fear of wrenching the wheels or injuring them otherwise.

It is well known that vehicles running on a track as a car are often injured in leaving the track, and in many cases the wheels are wrenched by engaging the edges of the rails at an acute angle. By the devices shown in the accompanying drawings it will be seen that a vehicle may cross the track at any desired point without any danger whatever, and the construction of the rails is neither complicated nor the cost of their manufacture increased.

In the drawings, Figure 1 is a view of a section of track employing my improved rails. Fig. 2 is a cross sectional view, and Fig. 3 a perspective view, of a complete rail.

Referring to the said drawings by letter, A indicates the rail, which may be formed of steel or other suitable metal. B indicates the tread of the said rail, and C the attaching-flange. The surface angles of both the tread and the flange are beveled longitudinally, as shown at $a$, and provided at suitable intervals with lugs or projections $e$. It will be observed by reference to Fig. 2 that the elevated tread B is underscored at $g$, so that it overhangs the roadway beyond the sleeper D, and is sustained upon the paving-stones. I thus secure a very solid and substantial foundation for the rails outside of the sleepers. It will also be observed that the inner vertical faces of the lugs $e$ are at right angles to the length of the rail, and that between these faces the edges of the rail are flat and inclined at an angle of about forty-five degrees. This peculiar construction of shoulders and inclined planes will direct the wheels of a vehicle crossing the rail over the elevations B C with very little shock or concussion.

When a vehicle is running on the track and it is desirable to turn off for the passage of a car, or for any reason whatever, the angles of the said tracks being beveled, as before mentioned, the wheels of the vehicle will not be abruptly engaged in turning off, but when the said wheels engage any of the lugs $e$ they may turn and cross the track without the slightest injury.

I do not wish to confine myself to any number of lugs or any special form of track, as it is obvious that any number of lugs may be used and the style of track varied according to the dictation of the mechanic or the company using them. These rails can take the place of the ones at present in use, and when laying them new the flange should project about a fourth of an inch above the sleepers.

Having described my invention, what I claim is—

1. A railway-rail having the inclined planes and square lugs or shoulders on the tread and flange, arranged substantially as described.

2. The railway-rail scored at $g$ so as to rest upon the paved road-stones outside of the sleepers, in combination with the longitudinal edges of said rail provided with one or more lugs and inclined planes, substantially as described.

3. A rail having the inclined planes and square lugs, in combination with the scored overhanging portion of the tread, substantially as described.

In testimony whereof I affix my signature in presence of witnesses.

JONATHAN S. HARSHMAN.

Witnesses:
VINCENT J. NOLAN,
M. V. NOLAN,
J. L. THOMSON.